United States Patent
Thibout (10) Patent No.: US 11,624,587 B2
(45) Date of Patent: Apr. 11, 2023

(54) SIGHTING DEVICE FOR VEHICLE AND ASSOCIATED VEHICLE

(71) Applicant: THALES, Courbevoie (FR)

(72) Inventor: Paul Thibout, Elancourt (FR)

(73) Assignee: THALES, Courbevoie (FR)

( * ) Notice: Subject to any disclaimer, the term of this patent is extended or adjusted under 35 U.S.C. 154(b) by 968 days.

(21) Appl. No.: 16/467,918

(22) PCT Filed: Dec. 11, 2017

(86) PCT No.: PCT/EP2017/082274
§ 371 (c)(1),
(2) Date: Nov. 26, 2019

(87) PCT Pub. No.: WO2018/108836
PCT Pub. Date: Jun. 21, 2018

(65) Prior Publication Data
US 2020/0191526 A1    Jun. 18, 2020

(30) Foreign Application Priority Data

Dec. 13, 2016  (FR) ..................... 16 01767

(51) Int. Cl.
*F41G 3/16*  (2006.01)
*F41G 3/22*  (2006.01)
(Continued)

(52) U.S. Cl.
CPC ............... *F41G 3/165* (2013.01); *F41G 3/22* (2013.01); *F41H 5/266* (2013.01); *G02B 23/08* (2013.01)

(58) Field of Classification Search
CPC ..... F41G 1/40; F41G 3/22; F41H 5/26; F41H 5/266; G02B 23/08; G02B 27/64
(Continued)

(56) References Cited

U.S. PATENT DOCUMENTS 3,464,757 A * 9/1969 Schmidt ................. G02B 23/12
                                                        250/353
3,743,217 A * 7/1973 Turck ...................... G01S 17/66
                                                        89/1.8
(Continued)

FOREIGN PATENT DOCUMENTS

EP    1 467 237 A1   10/2004
FR    2 584 202 A1    1/1987
WO    WO 2015/144919 A1  10/2015

OTHER PUBLICATIONS

Communication issued by the French Patent Office in countrpart French Application No. 1601767, dated Aug. 28, 2017.
(Continued)

*Primary Examiner* — Joshua E Freeman
*Assistant Examiner* — Benjamin S Gomberg
(74) *Attorney, Agent, or Firm* — ArentFox Schiff LLP (57) ABSTRACT

The vehicle delimits an interior space from an exterior space.
The sighting device includes:
  a support defining an interior volume,
  an optronic head adapted to rotate about an axis,
  an optical path comprising:
    a collecting optical unit for collecting a portion of the surroundings of exterior space, adapted to rotate about the axis; and
    an optical transport system including a plurality of optical components, portion of the components being, in the interior space and the other portion being in the interior volume;
  a drive means driving the optronic head and the collecting optical unit so that the ratio between the angle of rotation of the head and the angle of rotation of the collecting optical unit is substantially equal to 1.

10 Claims, 4 Drawing Sheets

(51) Int. Cl.
*F41H 5/26* (2006.01)
*G02B 23/08* (2006.01)

(58) Field of Classification Search
USPC .......................................... 359/402
See application file for complete search history.

(56) References Cited

U.S. PATENT DOCUMENTS

| | | | | |
|---|---|---|---|---|
| 4,108,551 A | * | 8/1978 | Weber .................... | G02B 23/08 |
| | | | | 359/861 |
| 4,626,905 A | * | 12/1986 | Schmidt .................. | F41H 5/266 |
| | | | | 348/343 |
| 4,773,752 A | * | 9/1988 | Bechet ................. | G02B 27/644 |
| | | | | 250/342 |

OTHER PUBLICATIONS

International Search Report in counterpart PCT Application No. PCT/EP2017/082274 dated Mar. 7, 2018.

* cited by examiner

SIGHTING DEVICE FOR VEHICLE AND ASSOCIATED VEHICLE

CROSS-REFERENCE TO RELATED APPLICATIONS

This application is a national phase entry of PCT Application No. PCT/EP2017/082274 filed Dec. 11, 2017, which claims priority to French Patent Application No. 16 01767, filed on Dec. 13, 2016. The disclosure of the application is incorporated in its entirety herein by reference.

The present invention relates to a sighting device. The present invention also relates to a vehicle equipped with such a sighting device.

The present invention relates to the field of land vehicles needing to observe the environment. For the military field, such an observation is carried out in tanks using sighting devices used in particular for firing.

Sighting devices are known having an optronic part provided with sensors adapted to move relative to a support. Such sighting devices are positioned "above the armor".

However, such sighting devices do not provide a direct optic view of the scene. Such a view is essential in case of malfunction of the optronic sensors.

Another type of sighting device, called "through viewfinder", proposes the use of a sighting system such as a monocular or a binocular positioned in the vehicle. The access to the environment is then done by direct vision through an opening formed in the wall of the vehicle.

Nevertheless, such a sighting device is generally bulky and involves a large opening in the wall of the vehicle, in particular in the case where it is desired to double the sighting system so that the crew leader of the vehicle has his own sighting system.

Also known from document FR 2,584,202 A1 is a stabilized sighting device comprising a camera sensitive to the thermal infrared carried by a platform mounted rotating around a first axis on mobile equipment rotating on a platform around a second axis perpendicular to the first, the camera being provided with an inertial stabilization system around two axes. The device also includes an optical viewfinder that comprises a pointing mirror mounted on the unit and driven in ½ ratio in rotation around an axis parallel to the former and an offset optical unit that returns the beam of light reflected by the pointing mirror.

However, the mass of the mirror disrupts the inertia of the device, which results in a less stable device, thus such a device involves using an inertial mass to stabilize the sighting of the optronic head that is produced by the mass of the infrared camera.

There is therefore a need for a sighting device allowing an operator to view the scene surrounding a vehicle directly, having a better compactness and better stability.

According to the invention, this aim is achieved by a sighting device for a vehicle, the vehicle including a wall delimiting an interior space from an exterior space, the sighting device including a support mounted rotating relative to the wall around a first axis, the support defining an interior volume, an optronic head for indirect observation of a first part of the environment of the space outside the vehicle, the optronic head being mounted rotating on the support around a second axis, the second axis being perpendicular to the first axis, a direct optical path for observation of a second part of the environment of the space outside the vehicle, the optical path comprising a collecting optical unit adapted to collect part of the environment of the space outside the vehicle, the collecting optical unit rotating around the second axis, and an optical transport system adapted to transport the image collected by the collecting optical unit to at least one predefined location in the interior space, the optical transport system including a plurality of optical components, part of the components being in the interior space and the other part of the components being in the interior volume of the support. The sighting device including a drive means driving the optronic head and the collecting optical unit so that, when the optronic head performs a rotation by a first given angle around the second axis, the collecting optical unit performs a rotation by a second given angle around the second axis, the ratio between the two angles being between 0.99 and 1.01, preferably equal to 1.

According to specific embodiments, the sighting device comprises one or more of the following features, considered alone or according to any technically possible combinations:
- the collecting optical unit is self-inertial with respect to the stabilization around the axis.
- an orientation is defined for the image obtained in the predefined location, the optical transport system comprising a twister arranged so that the image obtained in the predefined location has the same orientation for all of the possible orientations of the support and the drive means.
- the direct optical path includes at least two units, each unit performing a specific function for the sighting device, each unit having an input, the optical transport system including a switch making it possible to select one of the predefined locations toward which the optical transport system is adapted to transport the image collected by the collecting optical unit so that each predefined location is an input of a unit for which the specific function has been selected;
- the units performing a specific function for the sighting device are chosen from the group made up of a viewing unit, an eyepiece, a monocular, a binocular, an organic screen, a laser and a camera.
- the transport system is configured so that the optical beam between the components in the interior space and the components in the interior volume are a parallel optical beam.
- an elevation direction and a relative bearing direction are defined, the first axis being parallel to the relative bearing direction and the second axis being parallel to the elevation direction.

The invention also relates to a vehicle including a sighting device as previously defined.

According to one particular embodiment, the optical transport system includes a porthole, the porthole having a diameter smaller than or equal to 100 optically useful millimeters, the wall also includes the porthole, the porthole providing the tightness of the wall with respect to the exterior space.

Figure 1:
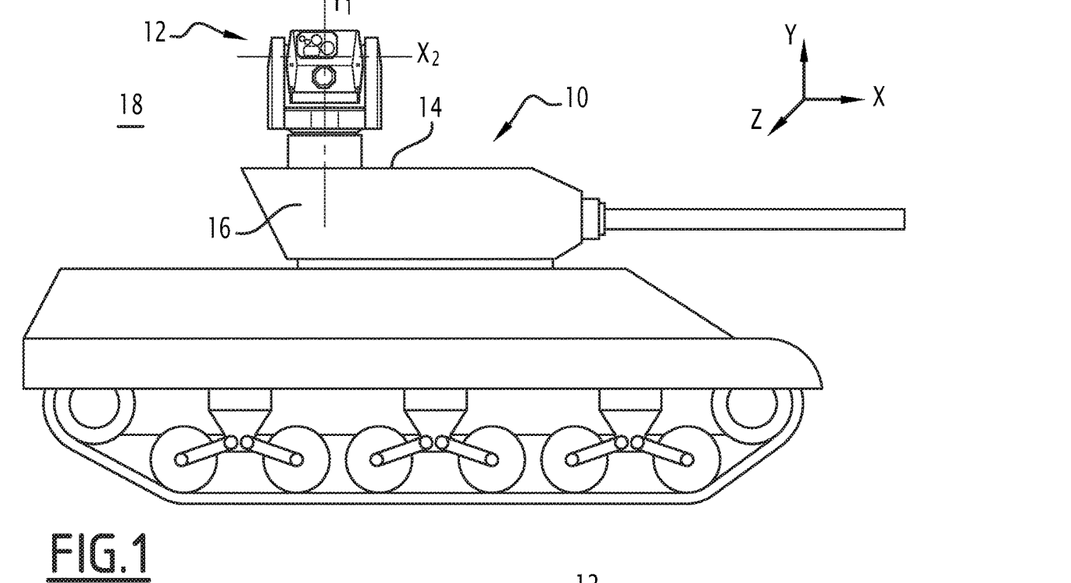
FIG. 1, a schematic view of a vehicle provided with an example sighting device.

Other features and advantages of the invention will appear upon reading the following description of embodiments of the invention, solely as an example and done in reference to the drawings, which are:

FIG. 1 shows a vehicle 10 provided with a sighting device 12.

The vehicle 10 is a land vehicle.

For example, the vehicle 10 is a military-type vehicle such as a tank.

Such a vehicle 10 is suitable for having a plurality of weapons and protecting at least one operator installed inside the vehicle 10. For example, the vehicle 10 has a firing cannon.

The vehicle 10 includes a wall 14 delimiting an interior space 16 from an exterior space 18.

More specifically, in the military context, the interior space 16 is the space to be secured, since it is the space in which the operator(s) will move while the exterior space 18 is the operating theater in which safety is more difficult to guarantee depending on the considered environment.

Figure 2:
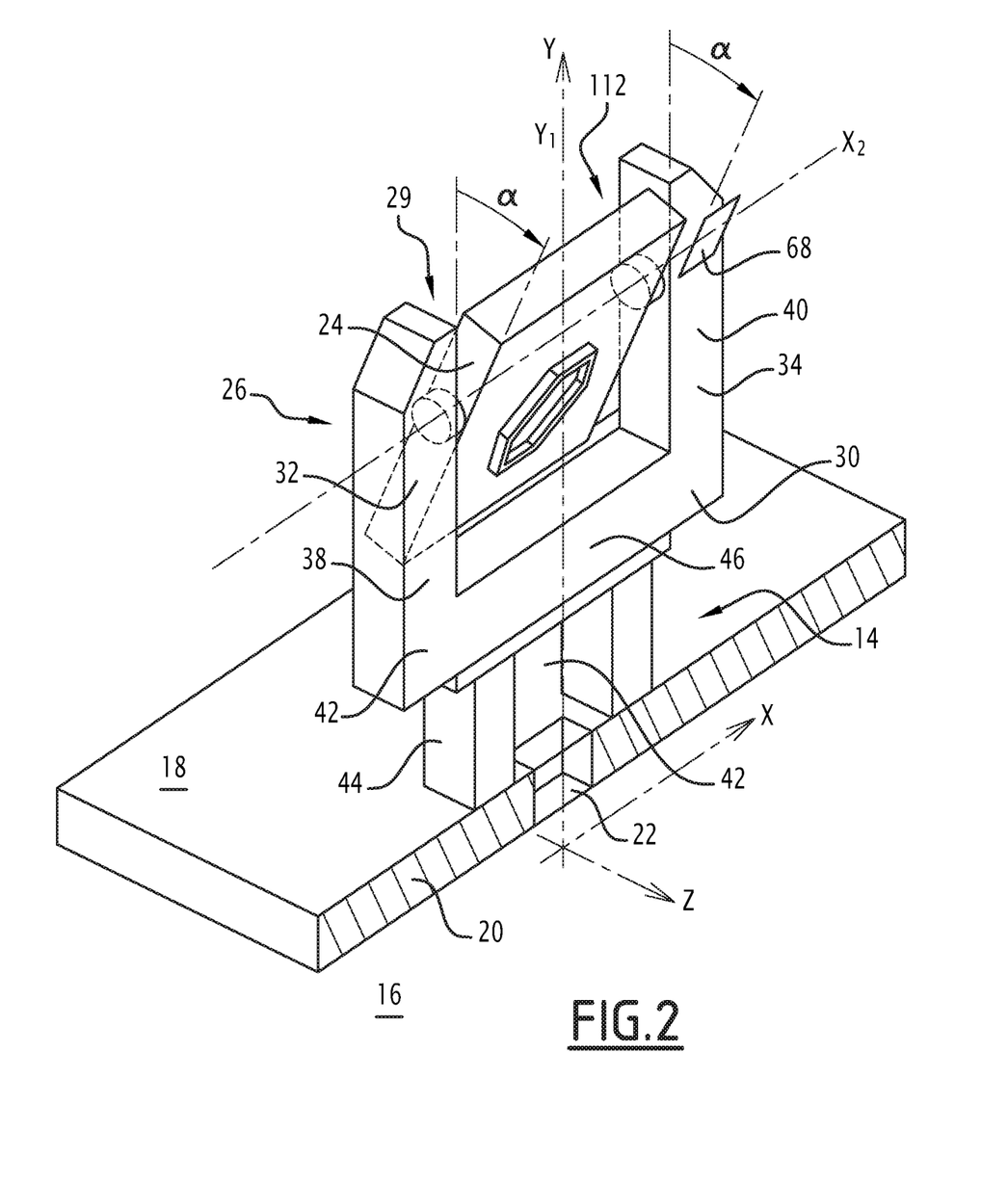
FIG. 2, a side view of a section of a sighting device of FIG. 1.

The wall 14 includes two parts 20 and 22, in particular visible in FIG. 2.

The first part 20 of the wall 14 is made from a first opaque material.

Typically, the first opaque material is strong enough to form armor of the vehicle 10, the vehicle 10 having to withstand shots.

The second part 22 of the wall 14 is made from a second transparent material.

Figure 3:
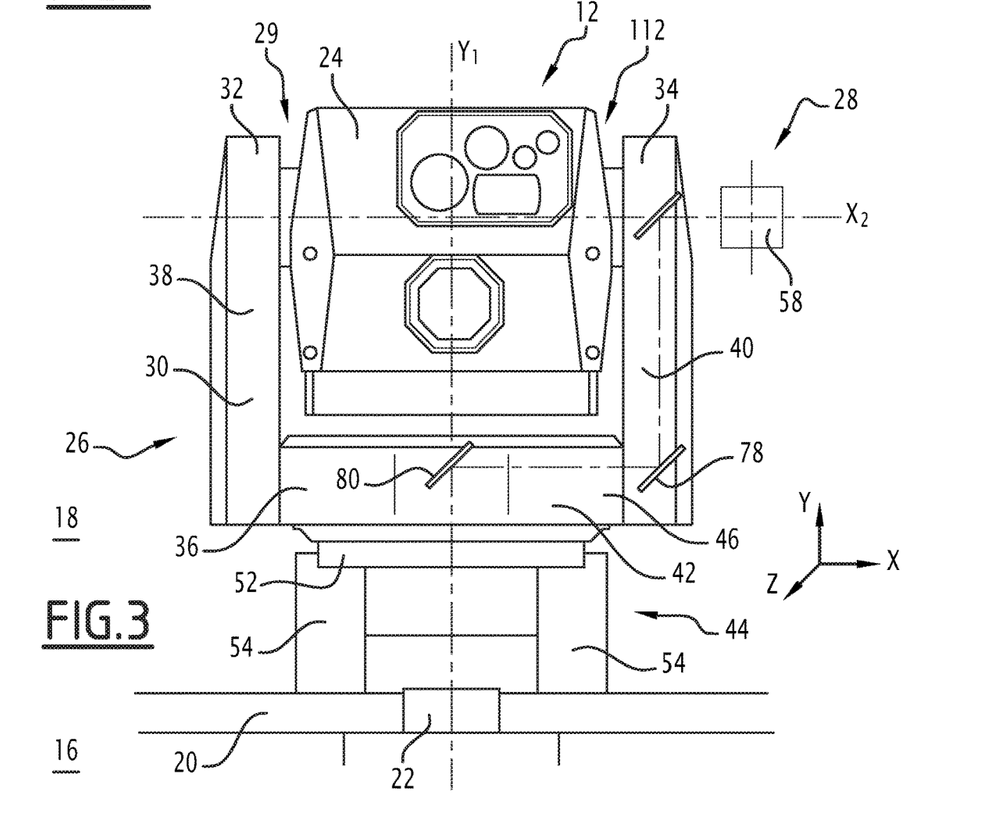
FIG. 3, a schematic side view of the sighting device of FIG. 1.
Figure 4:
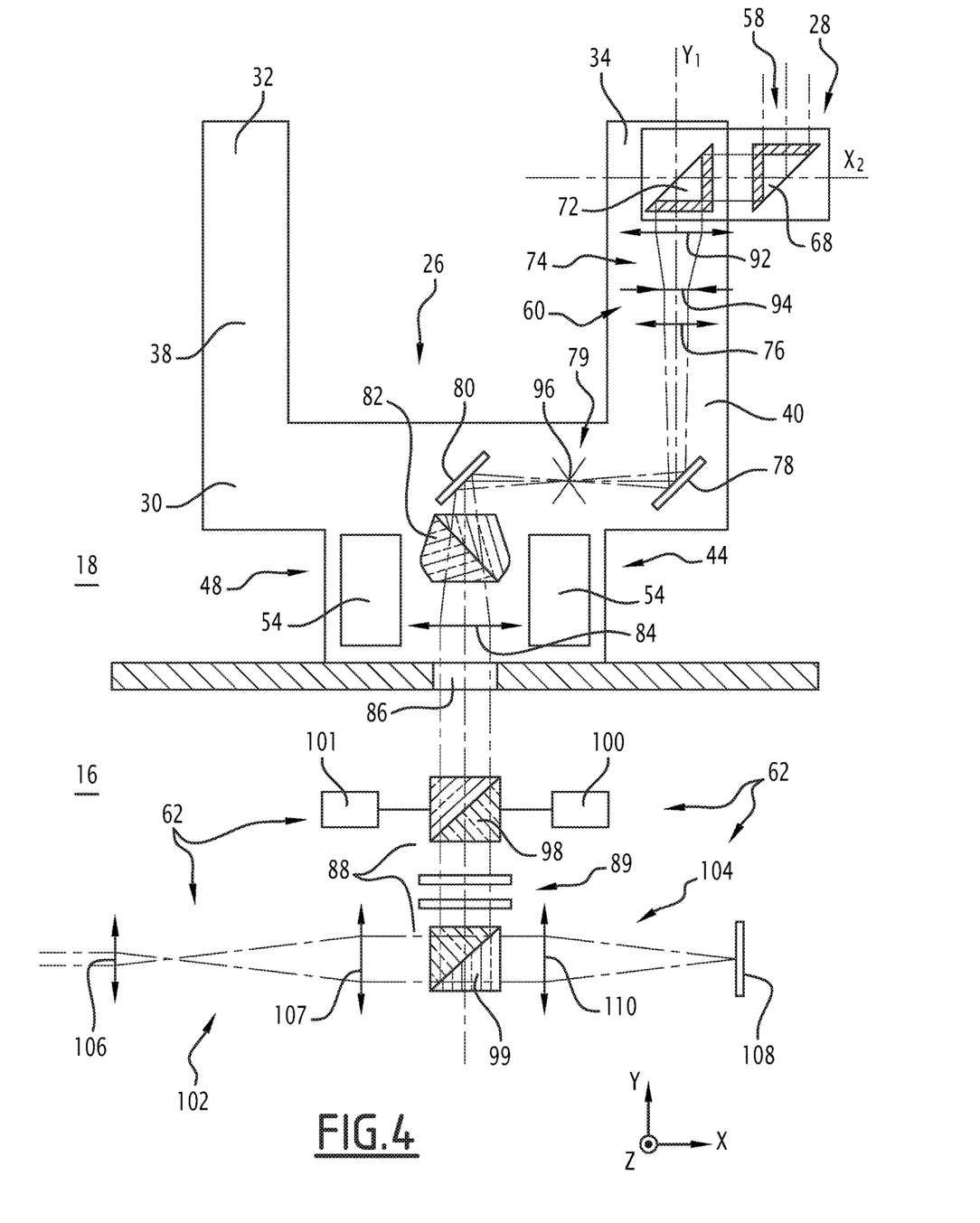
FIG. 4, sectional view of the sighting device of FIG. 1.

The sighting device 12 is described more precisely in reference to FIGS. 2 to 4.

For convenience, directions are defined.

A direction normal to the wall 14 is symbolized by an axis Y in FIG. 2. This direction corresponds to the relative bearing direction and will be called relative bearing direction Y in the remainder of the description.

A first transverse direction is also defined located in the plane of FIG. 2, the first transverse direction being perpendicular to the relative bearing direction. This direction is symbolized by an axis X in FIG. 2. This direction corresponds to the elevation direction and will be called elevation direction X in the remainder of the description.

A second transverse direction is also defined, symbolized by an axis Z in FIG. 2. The second transverse direction Z is perpendicular to the relative bearing direction Y and the elevation direction X.

The sighting device 12 includes an optronic head 24, a support 26, a direct optical path 28 and a drive means 29.

The optronic head 24 is an optronic head for observing a part of the environment of the exterior space 18 of the vehicle 10.

The optronic head 24 for example includes cameras adapted to capture the visible light, in black-and-white and/or in color, infrared cameras, telemeters, or pointers. The videos and the data collected by the optronic head are sent to the interior of the vehicle 10 by means of analog and/or digital signals.

The support 26 is intended to keep the optronic head 24 movable relative to a second axis X2. The optronic head 24 is mounted rotating on the support 26 around the second axis X2.

According to the illustrated example, the second axis X2 is parallel to the elevation direction X.

The support 26 includes a wall that makes it possible to delimit an interior volume 30.

The support 26 is movable around a first axis Y1, the first axis Y1 being parallel to the relative bearing direction Y.

More specifically, the support 26 includes two lateral arms 32 and 34, and a base 36.

The two lateral arms 32 and 34 and the base 36 are arranged to form a substantially U-shaped part.

In the specific example of FIG. 2, the two lateral arms 32 and 34 are identical.

Each of the two lateral arms 32 and 34 is located on either side of the optronic head 24 to provide the maintenance of the optronic head 24.

Each of the lateral arms 32 and 34 extends primarily along the relative bearing direction Y.

The wall of each lateral arm 32 and 34 is made from an aluminum-based alloy.

For each of the lateral arms 32 and 34, an interior volume 38 and 40 is defined.

According to the illustrated example, each lateral arm 32 and 34 has a substantially parallelepiped shape.

The base 36 has two parts: a central part 42 connecting the two lateral arms 32 and 34 and an interfacing part 44 with the wall 14.

The central part 42 is hollowed out such that a central volume 46 can also be defined for the central part 42.

In the case at hand, the interior volume 30 of the support 26 is therefore the sum of the lateral volumes 38 and 40 and the central volume 46.

The interfacing part 44 is a mechanical interface having, according to the case of FIG. 3, a cylinder shape with a hollowed out central part, the interfacing part delimiting an interior volume 54.

The interfacing part 44 supports an interface 52 delimiting an interior volume. The shape of the interface 52 is chosen so as to adapt to the shape of the optronic head 24.

The volume delimited by the sum of the interior volume of the interface 52 and the central volume 46 of the central part 42 includes motors, resolvers intended to command the motors, as well as an electric rotary joint and/or an optical fiber that are capable of transmitting signals or data between the optronic head 24 and the inside of the vehicle 10.

The motors are capable of driving a rotational movement of the support 26 relative to the wall 14 around the first axis Y1.

The interfacing part 44 is, according to the embodiments, stationary or a lift. In the case of FIG. 3, the interfacing part 44 is stationary.

The direct optical path 28 is adapted e to observe a part of the environment of the exterior space 18 of the vehicle 10.

The term "direct" is to be held up against the term "indirect".

Indeed, a direct view refers to a view possible by the human being directly, whereas an indirect view is a view via a screen, which assumes the operation of all of the elements involved in the viewing of the scene on the screen.

In reference to FIG. 4, the direct optical path 28 includes a collecting optical unit 58, a transport optical system 60 and a plurality of units 62.

The collecting optical unit 58 is arranged to collect a part of the environment of the exterior space 18 of the vehicle 10.

According to the illustrated example, the collecting optical unit 58 is a first prism 68.

In a variant, the collecting optical unit 58 is a planar mirror carried by the arm 34 of the support 26.

The collecting optical unit 58 is mounted rotating relative to the arm 34 of the support 26 around the second axis X2.

The optical transport system 60 is capable of transporting an image collected by the collecting optical unit 58 toward one or several predefined locations in the interior space 16.

The collecting optical unit 58 is self-inertial with respect to the stabilization around the second axis X2. In other words, the collecting optical unit 58 is configured so that, during a movement of the vehicle 10 causing a mechanical vibration of the support 26, the collecting optical unit 58 remains substantially immobile in rotation around the second axis X2.

The collecting optical unit 58 has a moment of inertia above a threshold moment of inertia, the threshold moment of inertia corresponding to a rotational stability of 0.1° for a rotation of 10° around the second axis X2.

The optical transport system 60 includes a plurality of optical components.

An optical component, in this context, refers to optical components allowing direct sighting by the operator.

As a result, a camera or any other electronic device cannot be considered an optical component.

One part of the optical components is in the interior space 16 of the vehicle 10 and the other part of the optical components is in the interior volume 30 of the support 26.

Each component is used to propagate the light or control its direction or prevent its passage, in particular if it involves closing members.

Hereinafter, the specific assembly of FIG. 4 is described, knowing that other assemblies performing the same function are of course possible.

In the specific example of FIG. 4, the optical transport system 60 includes a second prism 72, a Galilean binocular 74, a first lens 76, a first return mirror 78, a field lens 79, a second return mirror 80, a twister 82, a second lens 84, a porthole 86, a switch 88 and a closing system 89.

The preceding components have been presented in a specific order, from upstream to downstream, the upstream direction being defined as the location where the transport system 60 receives the outside image collected by the collecting optical unit 58 and the downstream direction as the location up to which the transport system 60 has transported the image of a part of the exterior space 18 collected by the collecting optical unit 58, i.e., the or each predefined location in the interior space 16.

The lateral volume 40 of the arm 34 extends primarily along the relative bearing direction Y.

The lateral volume 40 comprises a median plane extending along the transverse directions X and Z and defined as the plane separating the lateral volume 40 into two parts of equal volume extending along the relative bearing direction Y, namely an upper part located above the median plane, and a lower part located below the median plane.

The second prism 72 is positioned in the upper part of the interior volume 40 of the lateral arm 34.

The second prism 72 is a totally reflecting prism.

The second prism 72 is made from a material chosen to allow the transmission of an optical flow compatible with the optical bandwidth used by the direct optical path 28.

The second prism 72 is stationary.

The second prism 72 is adapted to return the beam from the first prism 68 that forms the collecting optical unit 58, toward the Galilean binocular 74.

According to another embodiment, the second prism 72 is replaced by a planar mirror forming a 45° angle with the relative bearing direction Y.

The Galilean binocular 74 is located in the upper part of the interior volume 40 of the lateral arm 34.

According to the specific example of FIG. 4, the Galilean binocular 74 includes two groups of lenses, a first group of lenses 92 and a second group of lenses 94.

The Galilean binocular 74 is capable of adjusting the size of the incident beam.

The Galilean binocular 74 has magnifications adapted to the type of scene to be observed.

The first lens 76 extends along the elevation direction X, in the median plane of the interior volume 40.

The first lens 76 is adapted to generate an image of a part of the exterior environment being observed, from the collected image, and is adapted to integrate, into the generated image, a crosshairs 96 alongside the field lens 79.

According to the illustrated example, the first group of lenses 76 is a convergent lens.

The first mirror 78 is a planar mirror located in the lower part of the interior volume 40 of the lateral arm 34.

The second mirror 80 is a planar mirror located in the central volume of the central part 42 of the support 26.

The two return mirrors 78 and 80 are arranged such that the beam passing through the lateral arm 34 is returned into the central part 42 parallel to the relative bearing direction Y.

Between the two return mirrors 78 and 80, the beam converges at a focus point. The crosshairs 96 and the field lens 79 are placed at the focus point.

The field lens 79 makes it possible to optimize the full light field and the crosshairs 96 makes it possible to facilitate the sighting.

According to one variant, the field lens 96 has no crosshairs.

The twister 82 is formed by the assembly of two prisms separated by an air knife and arranged to form a Pechan prism.

According to one variant, the twister 82 is positioned before the lens 84.

This makes it possible for the optical beam between the components in the interior space 16 and the components in the interior volume 30 to be a convergent optical beam.

In a variant, any other type of twister 82 is conceivable, and is positioned either before the lens 84 or after the lens 84. For example, the twister 82 is a Dove prism. In this case, the twister 82 is positioned in a zone where the optical beam is a parallel optical beam.

The twister 82 is arranged to obtain, in the or each defined location, an image with the same orientation, independently of the rotational movements of the optronic head 24 and the support 26.

The second lens 84 is inserted between the porthole 86 and the twister 82.

The second lens 84 is arranged so that the optical beam transmitted to the interior space 16 through the porthole 86 is a parallel optical beam.

The porthole 86 forms the second part 22 of the wall 14 delimiting the interior space 16 from the exterior space 18.

The porthole 86 is made from a material that is transparent in the visible spectrum (radiation having a wavelength of between 400 nanometers and 800 nanometers), as well as in the following domains: near infrared (also referred to by the acronym NIR) and shortwave infrared (also referred to by the acronym SWIR).

The porthole 86 is arranged to allow the image transported by the optical transport system 60 to pass between the exterior space 18 and the interior space 16.

The porthole 86 has a diameter smaller than or equal to 100 millimeters and is intended to provide the tightness of the wall 14 with respect to the exterior space 18. The indicated diameter corresponds to the optically useful diameter, i.e., to the porthole portion 86 intended for the passage of optical beams.

According to one variant, the direct optical path 28 does not include a sealing porthole.

For the part of the optical components belonging to the interior space 16, in the described example, the optical transport system 60 comprises a switch 88 including a first cube 98 and a second cube 99.

According to one variant, the cubes 98 and 99 are blades with parallel faces.

The switch 88 is adapted to select one of the predefined locations toward which the optical transport system 60 will steer the collected image. In the example of FIG. 4, such a selection is made by the two cubes 98 and 99.

According to the example of FIG. 4, the first cube 98 interacts with two predefined locations.

"Interacts" here refers to the ability of a cube to transport the collected image toward the predefined location.

The second cube 99 interacts with two other predefined locations.

The closing system 89 is inserted between the cubes 98 and 99.

The closing system 89 comprises a plurality of closing members, two of which are shown in FIG. 4.

Each closing member extends primarily along the elevation direction X.

The closing system 89 makes it possible to protect the operator of the vehicle 10 from external and internal laser beams, and also makes it possible to monitor the scene flow.

In the illustrated example, each unit 62 includes an input and performs a function.

Each predefined location corresponds to an input of a unit 62. For the described example, it is therefore possible to consider that the first cube 98 interacts with a first unit 100 and a second unit 101 while the second cube 99 interacts with a third unit 102 and a fourth unit 104.

In general, the units 62 perform a specific function for the sighting device 12 and the switch 88 makes it possible to select one of the predefined locations toward which the optical transport system 60 is capable of transporting the image collected by the collecting optical unit 58 so that each predefined location is an input of a unit 62 for which the specific function has been selected.

The units 62 perform a specific function for the sighting device 12 and are chosen from the group made up of: a viewing unit, an eyepiece, a monocular, a binocular, an organic screen, a laser and a camera.

In the described example, the first unit 100 is a blooming system.

The blooming system 100 is a power laser powerful enough to ensure the blooming of a potential target.

The second unit 101 is a sensor adapted to ensure an additional electronic observation.

The third unit 102 is a binocular 102 allowing the operator to look with his eyes, the binocular 102 being used to adjust the sizes of the beam.

According to the example of FIG. 4, the binocular 102 includes two lenses 106 and 107 and a beam separating system, not shown, adapted to steer the optical beam toward each of the eyepieces of the binocular 102.

The fourth unit 104 includes a screen 108 of the OLED (Organic Light-Emitting Diode) type as well as a focusing optical unit 110.

The resolution of the screen 108 is compatible with the sensor matrices of the various cameras used.

The drive means 29 is adapted to drive a rotational movement of the optronic head 24 and the collecting optical unit 58 around the second axis X2.

The drive means 29 is adapted to drive the optronic head 24 and the collecting optical unit 58 so that, when the optronic head 24 performs a rotation by a first given angle α around the second axis X2, the collecting optical unit 58 performs a rotation by a second given angle around the second axis X2, the ratio between the two angles being between 0.99 and 1.01, preferably equal to 1.

The drive means 29 is for example made by a motor secured to a driveshaft 112 that extends along the second axis X2.

The collecting optical unit 58 is connected to an extension of the driveshaft 112 at the interior volume 40 of the right lateral arm 34 of the support 26.

According to one variant, the drive means 29 is made by two motors or resolvers. The first motor is secured to the driveshaft 112, and is adapted to command a rotational movement of the optronic head 24. The second motor is adapted to command a rotational movement of the optronic collecting unit 58, and is configured to reproduce the commands of the first motor. This configuration corresponds to a slaving of the second motor as follower of the first motor.

The operation of the sighting device 12 will now be described.

During operation, the sighting device 12 has several functions: on the one hand, owing to the optronic head 24, the sighting device 12 makes it possible to observe part of the scene by using different cameras adapted to produce images in different spectral bands owing to the different cameras, for example in the visible spectrum, and in the infrared (radiation whereof the wavelength is between 800 nanometers and 14 micrometers). The cameras in particular make it possible to produce images in the following domains: NIR, SWIR, IR2 (wavelength between 3 micrometers and 5 micrometers) and IR3 (wavelength between 7.5 micrometers and 14 micrometers).

When the operator commands a rotation around the first axis Y1 of the support 26 maintaining the optronic head 24, the support rotates and the observer can observe another part of the scene.

In case of failure of the optronic head 24, the operator can use the direct path 28 for example via a unit 62 suitable for viewing of the scene such as the binocular 102. In this way, the operator observes the scene with the naked eye and can continue his mission.

In case of vehicle current outage, the support 26 can, under operator control, automatically position itself at "zero relative bearing" (boresighting position with the firing cannon) and locks owing to a backup battery, and the operator can also use the direct path 28 to view the scene.

According to one variant, the support 26 is connected to the cannon of the vehicle 10. In this case, during a vehicle current outage, the cannon of the vehicle 10 drives, via a mechanical connection, a movement of the twister 82 with a ½ ratio and a movement of the collecting optical unit 58 with a ratio 1. This driving by mechanical connection is configured to position the relative bearing of the support 26 in the "zero relative bearing" position, boresighted at the cannon.

When the operator commands a rotation of the optronic head around the second axis X2, the drive means 29 drives the optronic head 24 and the collecting optical unit 58, so that the optronic head 24 performs a rotation by a first angle around the second axis X2, the angle corresponding to the command from the operator, and so that when the optronic head 24 performs the rotation, the collecting optical unit 58 performs a rotation by a second given angle around the second axis X2, the rotation between the two angles being between 0.99 and 1.01, preferably equal to 1.

During the rotational movement, the image collected by the collecting optical unit 58 has a variable orientation. When the image reaches the twister 82, it is reoriented by the twister 82 so that the collected image reaches the predefined locations with the same orientation, despite the rotation of the collecting optical unit 58 and the rotation of the support 26 around the first axis Y1.

The operator also has the possibility of using a laser 100 to detect, bloom, or even destroy a pointed optical unit.

Figure 5:
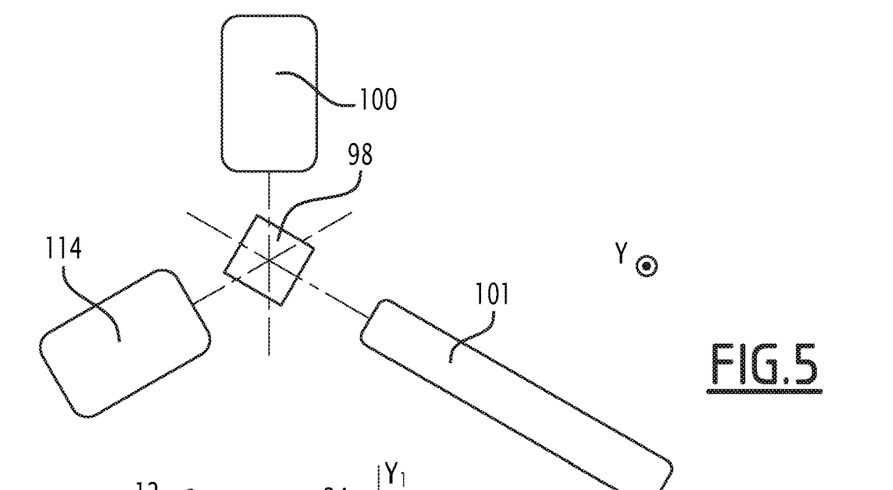
FIG. 5, a schematic top view of an example of the sighting device.

In a variant, as illustrated by FIG. 5, the sighting device 12 can be provided with a plurality of sensors installed in the zone located in the interior space 16, after the lens 84 where the beam is a parallel optical laser.

According to the example of FIG. 5, the interior space 16 is distributed evenly into three zones, one zone for the laser system 100, another zone for the first sensor 101 and another zone for a second sensor 114.

Of course, configurations with a greater number of units 62, in particular more sensors, could be considered.

Figure 6:
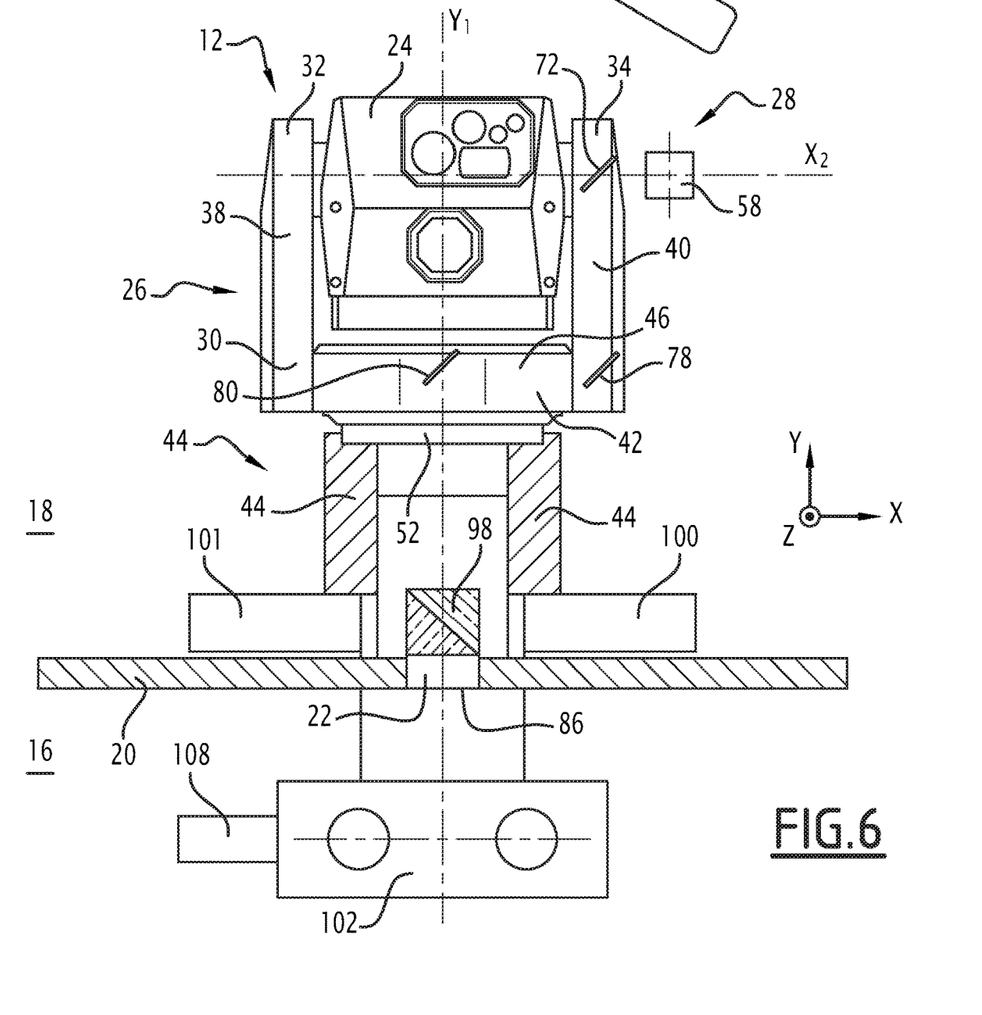
FIG. 6, a schematic view of another example of the sighting device.

According to another example, as illustrated by FIG. 6, the sensors and/or the blooming system 100 are in an exterior space 18, alongside the wall 14.

In this example, the interfacing part 44 is arranged to make it possible for the cube 98, positioned in the exterior space 18, to interact with the blooming system 100, and with the sensor 101.

This makes it possible to clear space in the interior space 16 to arrange other bulky systems in the interior space 16. By comparison, the equipment takes up less room in the interior space of the vehicle 10 than a so-called through viewfinder with direct optical path.

In another embodiment, only the blooming system 100 is positioned outside toward the interior space 18 of the vehicle 10 to be brought toward the direct optical path 28.

According to one variant, the optical path 28 is integrated into the two arms of the support 26.

In all of the preceding embodiments, an optical path is integrated into one of the arms or into both arms of the support 26 of the sighting device 12, which makes it possible to obtain an exterior observation beam picked up on eyepieces.

Such an optical observation path 28 includes a twister 82 that makes it possible to keep the orientation of the image obtained in the predefined locations irrespective of the orientation of the collecting optical unit 58 and irrespective of the rotational movement of the support 26 around the first axis Y1.

This makes it possible to keep stationary eyepieces to observe an image of constant orientation.

Such an optical path 28 makes it possible to use different functions owing to a switch 88 interacting with a plurality of units 62 placed in the interior space 16 of the vehicle.

This makes it possible to extend the number of functionalities of the sighting device 12 without detriment to the stability of the sighting device.

Such an optical path 28 makes it possible to obtain a parallel optical beam passing through the armor. This makes it possible to position the sighting device at different heights while keeping the collected image, and also allows the use of power lasers.

Such an optical path 28 for direct observation has physiological advantages for operators and makes it possible to resolve any uncertainties contained in an image obtained by indirect observation of outside scenes.

Such an optical observation path 28 makes it possible to add a gyrostabilized direct viewing function that does not involve a strong opening of the armor (about 100 mm in diameter). This makes it possible to retain a high integrity level of the vehicle 10 with respect to outside stresses and to guarantee good control of the tightness of the wall 14.

Such an optical observation path 28 makes it possible to keep only one identical sighting device 12 for the crew leader and the operator, with only an adjustment of the optical transfer toward the eyepieces as a function of the place in the tank.

Such an optical observation path 28 facilitates the integration of new sensors into the optronic head 24.

Such an optical observation head 28 makes it possible to resolve a failures of the sighting device 12 in case of electrical outage or failure of the optronic head 24 (backup mode).

Furthermore, the volume located in the interior space 16 is minimal, which makes it possible to add, if desired by the operator, additional functions such as larger screens.

This sighting device 12 also makes it possible, without impact on the stabilization of the view, to add scrambling or destruction lasers and/or other cameras positioned on the wall or below the wall 14.

Such a stabilized sighting device 12 has no follower cover and porthole associated with the cover, which makes it possible to reduce the cost [and] bulk.

The present invention covers all technically possible combinations of the embodiments that have been described above.

The invention claimed is:

1. A sighting device for a vehicle, the vehicle including a wall delimiting an interior space from an exterior space, the sighting device including:
   a support mounted rotating relative to the wall around a first axis, the support defining an interior volume, the support including two lateral arms and a base, the two lateral arms and the base being arranged to form a substantially U-shaped part,
   an optronic head for indirect observation of a first part of the environment of the exterior space, the optronic head being mounted rotating on the support around a second axis, the second axis being perpendicular to the first axis,
   a direct optical path for observation of a second part of the environment of the exterior space, the optical path comprising:
      a collecting optical unit adapted to collect an image of the second part of the environment of the exterior space, the collecting optical unit rotating around the second axis, and
      an optical transport system adapted to transport the image collected by the collecting optical unit to at least one predefined location in the interior space, the optical transport system including a plurality of optical components, part of the optical components being in the interior space and the other part of the optical components being in the interior volume of the support, at least one of the optical components being in one of the lateral arms, and
   a drive organ driving the optronic head and the collecting optical unit so that, when the optronic head performs a rotation by a first given angle around the second axis, the collecting optical unit performs a rotation by a second given angle around the second axis, the ratio between the two angles being between 0.99 and 1.01.

2. The sighting device according to claim 1, wherein the collecting optical unit remains substantially immobile in rotation around the second axis during movement of the vehicle.

3. The sighting device according to claim 1, wherein an orientation is defined for the image in the at least one predefined location, the optical transport system comprising a twister arranged so that the image in the at least one predefined location has the same orientation for all possible orientations of the support and the drive organ.

4. The sighting device according to claim 1, wherein the direct optical path further includes at least two units, each of the at least two units performing a specific function, each of the at least two units having a respective input, the optical transport system including a switch making it possible to select one of the at least one predefined location to which the optical transport system is adapted to transport the image collected by the collecting optical unit so that each of the at least one predefined location is one of the inputs of the at least two units for which the specific function has been selected.

5. The sighting device according to claim 4, wherein each of the at least two units are chosen from the group consisting of: a viewing unit, an eyepiece, a monocular, a binocular, an organic screen, a laser, and a camera.

6. The sighting device according to claim 1, wherein the optical transport system is configured so that an optical beam between the optical components in the interior space and the optical components in the interior volume is a parallel optical beam.

7. The sighting device according to claim 1, wherein an elevation direction and a bearing direction are defined with respect to the vehicle, the first axis being parallel to the bearing direction and the second axis being parallel to the elevation direction.

8. A vehicle including the sighting device according to claim 1.

9. The vehicle according to claim 8, wherein the optical transport system includes a porthole, the porthole having a diameter smaller than or equal to 100 millimeters, the porthole being included in the wall.

10. The sighting device according to claim 1, wherein the ratio between the two angles is equal to 1.

* * * * *